Oct. 24, 1967     T. F. CALLAHAN     3,348,448
OPTICAL DEVICE FOR DETERMINING ANGLES BY MEASURING THE
ORIENTATION OF ONE IMAGE WITH RESPECT TO ANOTHER
Filed Oct. 11, 1963     3 Sheets-Sheet 1
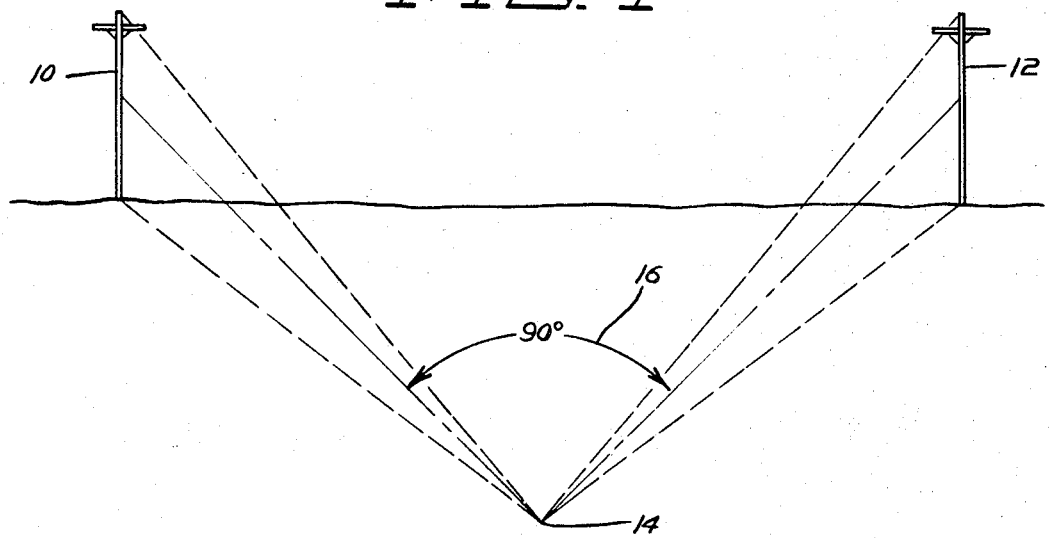
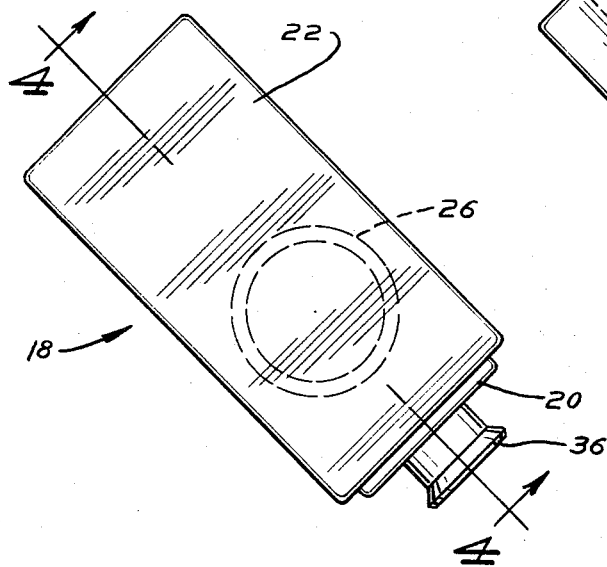
INVENTOR.
THEODORE F. CALLAHAN
BY
Meyers & Peterson
ATTORNEYS Oct. 24, 1967 T. F. CALLAHAN 3,348,448
OPTICAL DEVICE FOR DETERMINING ANGLES BY MEASURING THE
ORIENTATION OF ONE IMAGE WITH RESPECT TO ANOTHER
Filed Oct. 11, 1963 3 Sheets-Sheet 2
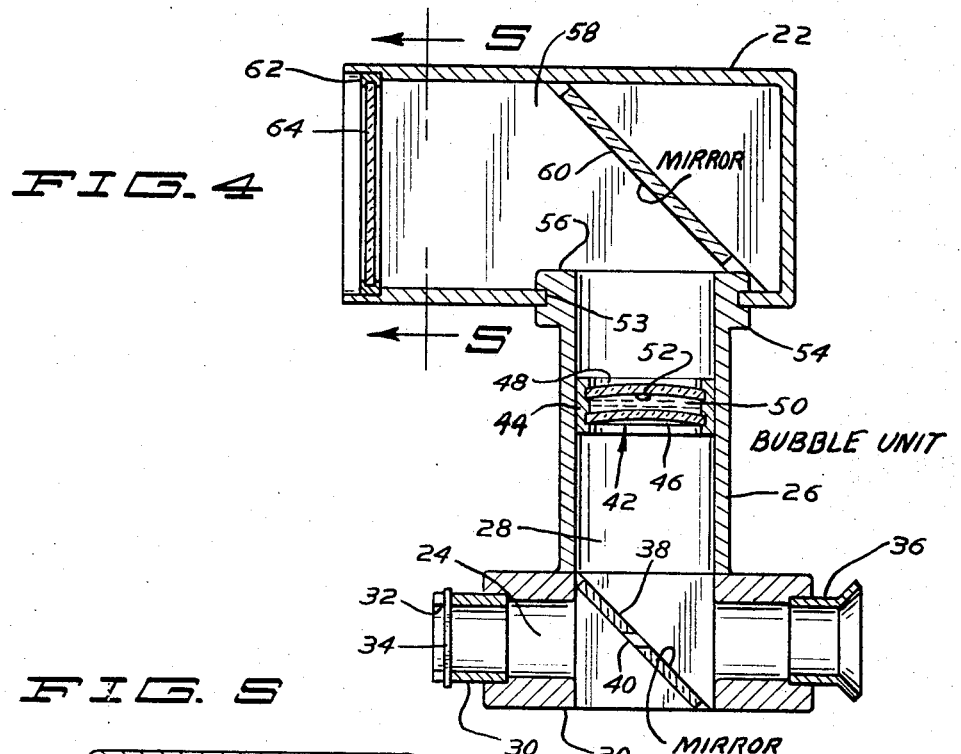
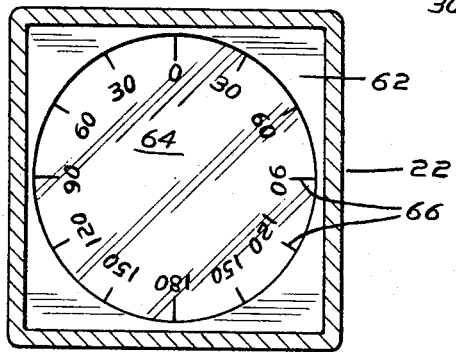
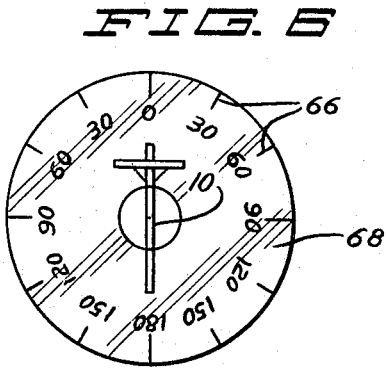
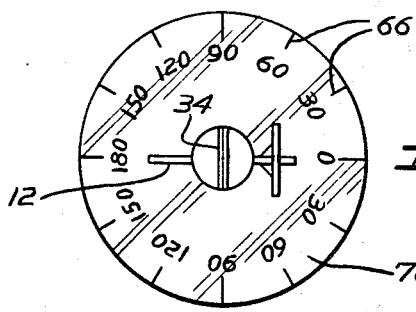
INVENTOR.
THEODORE F. CALLAHAN
BY
Meyers & Peterson
ATTORNEYS

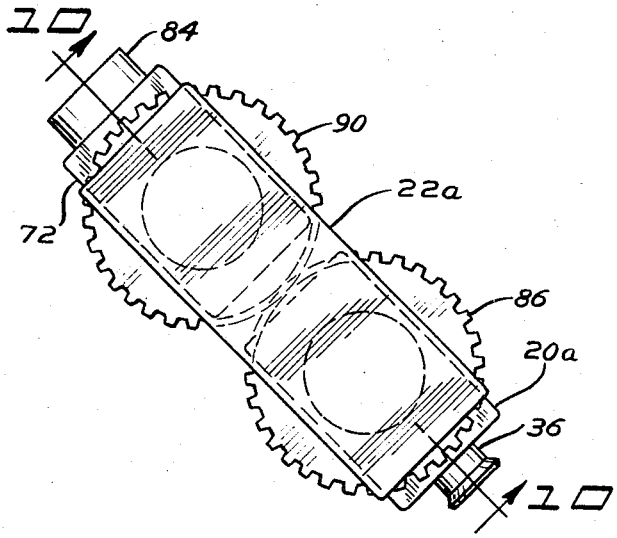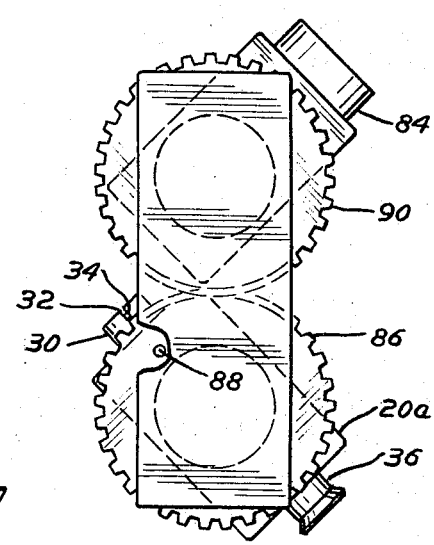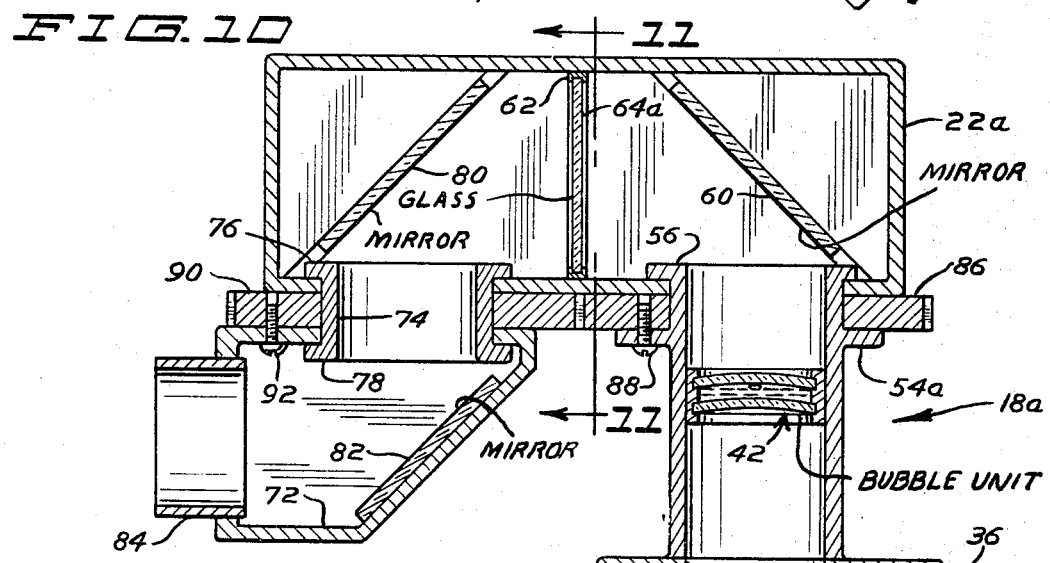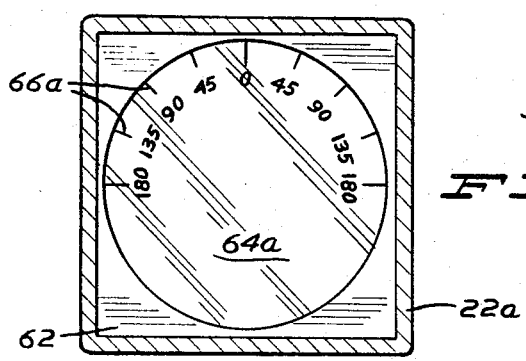

United States Patent Office 3,348,448
Patented Oct. 24, 1967

3,348,448
OPTICAL DEVICE FOR DETERMINING ANGLES BY MEASURING THE ORIENTATION OF ONE IMAGE WITH RESPECT TO ANOTHER
Theodore F. Callahan, Iron River, Wis. 54847
Filed Oct. 11, 1963, Ser. No. 315,552
5 Claims. (Cl. 88—2.4)

ABSTRACT OF THE DISCLOSURE

A first mirror arranged at a 45° angle has an opening therethrough so that an object may be viewed both directly and indirectly. Light arriving indirectly first parallels the direct line of sight and is then reflected downwardly in a vertical direction by a second 45° mirror. The second mirror is rotatable about a vertical axis so as to allow viewing of a second object. By means of a transparent disc having angularly disposed graduations thereon, the angle through which the second mirror is rotated can be measured by the amount the image is rotated and hence an indication of the angle between objects is provided. In a more elaborate embodiment, additional mirrors are utilized.

---

This invention relates generally to optical instruments, and pertains more particularly to a device for use by surveyors, draftsmen, navigators, and others in determining angles.

Precision instruments of various types have been devised and marketed. While many of these instruments have fulfilled their intended purpose very effectively, the fact remains that the majority of them are costly, heavy and time-consuming to use. The well-known transit is but one example of an instrument that is not only bulky but which requires a considerable amount of time to set up as well. Consequently, a real need exists for an optical device capable of determining angles very quickly and which is sufficiently compact and light weight that it can be carried about without inconvenience.

Accordingly, the invention has among its objects the provision of a simple device that can be held in the user's hand when sighting, yet which will be sufficiently accurate for use in a large number of situations where true precision is not needed. For instance, in public utility work the laying out of power and telephone lines, water and sewer conduits, and the like require that angles be measured and that they be determined as quickly as possible with a reasonable degree of accuracy. This is particularly true in carrying out right-of-way operations and making other traverses that can be considered of a preliminary nature. Also, in other situations a fast or rapid sighting and reading is needed where moving objects are involved, such as boats, airplanes, automobiles and trucks. Because of the time the more complex instruments have taken, guessing has been frequently resorted to but with considerable error. It is an aim of the present invention to provide a device so easy to use that guessing will be discouraged.

These and other objects and advantages of this invention will more fully appear from the following description, made in connection with the accompanying drawing, wherein like reference characters refer to the same or similar parts throughout the several views and in which:

FIGURE 1 is a perspective view showing two power or telephone poles and a point from which the angle between said poles is to be determined.

FIGURE 2 is a top plan view of one embodiment my invention may assume, the device being oriented so as to sight initially on the pole at the left in FIGURE 1;

FIGURE 3 is a top plan view of the device of FIGURE 2 oriented so as to determine the angle between the two poles of FIGURE 1;

FIGURE 4 is a sectional view of the device taken in the direction of line 4—4 of FIGURE 2;

FIGURE 5 is a sectional view taken in the direction of the line 5—5 of FIGURE 4;

FIGURE 6 is an elevational view of the image that the user sees when the device is oriented in the position depicted in FIGURE 2;

FIGURE 7 is a view showing the image that the user obtains when the device is oriented in the position shown in FIGURE 3;

FIGURE 8 is a top plan view corresponding to FIGURE 2 but showing a different embodiment of the invention;

FIGURE 9 is a top plan view corresponding to FIGURE 3 but showing the modified device of FIGURE 8;

FIGURE 10 is a sectional view taken in the direction of line 10—10 of FIGURE 8, and FIGURE 11 is a sectional view taken in the direction of line 11—11 of FIGURE 10.

Referring first to FIGURE 1, two power or telephone poles 10, 12 have been shown in a spaced relationship with each other. It will be assumed, for the sake of discussion, that a vantage point 14 exists at which point the angle between the poles 10, 12 is to be determined. It will also facilitate the discussion to further assume that the angle between the line of sight from the point 14 to the pole 10 and from the point 14 to the pole 12 is 90 degrees. Obviously, the poles 10, 12 might be any other objects, because the invention will have general utility as far as determining angles is concerned. For example, the pole 10 might very well be one corner of a building and the pole 12 might be a second building. Still further, the pole 10 might be one boat or other moving object, and the pole 12 a different moving object. The 90-degree angle has been represented by the reference numeral 16 in FIGURE 1.

Referring now to FIGURE 2, the optical device forming one embodiment that my invention may assume has been denoted generally by the reference numeral 18 and includes a lower casing 20 and an upper casing 22. As the description progresses, it will become apparent that the casing 22 is rotatably mounted with respect to the casing 20 so that it can be rotated or turned through the appropriate angle that is to be determined. It has already been stated that we are herewith dealing with a 90-degree angle. Hence, FIGURE 2 shows the device 18 in a position corresponding to the line of sight the device would assume when looking from the point 14 toward the pole 10, whereas FIGURE 3 shows the device oriented in such a position that the upper casing 22 is aligned with the pole 12 although the lower casing 20 continues to be directed at the pole 10.

Describing the lower casing 20 in more detail, it will be discerned from FIGURE 4 that it includes a portion 22 having a horizontal passage or hollow interior 24; the casing 20 also includes an upwardly directed tubular portion 26 having a bore 28. While the casing portion 22 is shown horizontally and the portion 26 vertically, it will be understood that these directions are only relative and that the device 18 need not be held in the position shown in FIGURE 4 if, say, vertical or inclined angles are to be measured. In the arrangement that has been illustrated, though, it is assumed that the angle represented by the reference numeral 16 is an unknown horizontal angle that is to be measured.

In order to simplify the drawings as much as possible, the device 18 should be regarded as having been pictured in a rather schematic or fundamental form. However, at this point in the description it can be stated that the passage 24 is intended to pass light rays coming directly from the object 10 to the eye of the observer. While not an essential element in the construction, a tube 30 has been shown extending forwardly from one end of the portion 22 of the casing 20. Inasmuch as it is desired that a reference line be provided, the forward end of the tube 30 is slotted at 32 for the accommodation of a thin vertical member 34. The role played by the member 34 is merely for the purpose of providing what amounts to a "hair" line and could very well be drawn on a suitable glass lens. However, the use of the member 34 makes it easier to visualize that a reference line is provided in the depicted construction. Another member that is not absolutely essential is eyepiece 36 against which the observer's eye is placed when using the device 18.

Disposed at a 45-degree angle within the passage 34 is a mirror 38 having a hole or aperture 40 extending therethrough. The hole 40 is in alignment with the longitudinal axis of the tube 30 and also in alignment with the axis of the eyepiece 36. Stated somewhat differently, the light rays from the pole 10 can be considered to enter the passage 24 via the tube 30 and then pass through the hole 40 in the mirror 38. Finally, these direct rays from the object 10 pass through the eyepiece 36 and the observer is thereby provided with a direct line of sight in the direction of the pole 10 when standing at the vantage point 14.

When the device 18 is held in the position pictured in FIGURE 4, the tubular portion 26 of the casing 20 causes the bore 28 to extend vertically. It will presently be made manifest that light rays are directed downwardly through the bore 28 so as to impinge on the mirror 38 and then be reflected to the observer through the eyepiece 36.

Since the device 18 will be usually employed for measuring horizontal angles, it will be extremely helpful to the user to be able to ascertain very easily when the device 18 is held or oriented properly for measuring a particular horizontal angle. With this in mind, a bubble unit 42 is fixedly mounted within the bore 28. The unit 42 includes a retaining ring 44 that engages the inner wall of the tubular portion 26. While the unit 42 is shown in a very simplified form, it will be perceived that a lower transparent lens 46 is held by the retainer 44 and an upper lens 48 is similarly held, the lenses 46, 48 being slightly spaced one above the other. Between the lenses 46, 48 is a small supply of liquid labeled 50 with an even smaller quantity of air entrapped therein so as to form a bubble 52. The bubble 52 naturally seeks the highest point within the unit 42 and will thereby indicate to the observer when the tubular portion 26 is vertical which of course signifies that the portion 22 is then horizontal.

While a number of bearing arrangements might be utilized for the purpose of rotatably mounting the casing 22 with respect to the casing 20, a simplified arrangement has been illustrated. The lower or bottom portion of the casing 22 is apertured at 53. The tubular portion 26 is formed with a lower flange 54 adjacent its upper end and an upper flange 56 at its upper end with a space therebetween equivalent to the thickness of the bottom wall of the casing 22. In this manner, the casing 22 can be rotated about the axis of the tubular portion 26, which is a vertical axis as shown in FIGURE 4.

The interior of the casing 22 has been indicated by the reference numeral 58. Within the interior 58 of the casing 22 is located a mirror 60 disposed at a 45 degree angle with respect to the axis of the tubular portion 26. Whereas the lower mirror 38 is fixedly disposed when in use, the upper mirror 60 is rotatable when the casing 22 is rotated. This is quite important to a practicing of the invention and the benefit to be derived therefrom will become clearer as the description proceeds.

At this time attention is called to a retaining member 62 fitted in the interior 58 adjacent the open end of the casing 22 which open end is located at the left of FIGURE 4. The retainer 64 holds a transparent member 64 which is in the form of a glass disc or lens having angularly spaced graduations 66 extending about its periphery. These graduations 66 have associated therewith the appropriate numerals which signify specified angles as can best be viewed in FIGURE 5. Thus, it will be appreciated that any light rays entering the casing 22 pass through the transparent member 64 and then proceed along an axis generally parallel to the axis on which the hole 40 of the mirror 38 is located. Consequently, when the upper casing 22 is oriented with respect to the casing 20 as shown in FIGURE 2, the observer looking through the eyepiece 36 sees a composite image indicated by the reference numeral 68 and which is shown in FIGURE 6. What the observer sees is the vertical member 34 which can be observed through the hole 40 and a central portion of the pole 10. This is on a direct sight basis. However, a second portion of the pole 10 is seen by reason of the light rays passing through the transparent member 64 along an axis above the direct line of sight axis, the light rays being reflected from the upper axis down along the vertical axis extending through the tubular portion 26. The downwardly directed rays are then reflected horizontally by the inclined mirror 38 so that the observer sees the remaining portion of the pole 10 as pictorially set forth in FIGURE 6 and which image is identified by the reference numeral 68.

After aligning the image so that it has the appearance depicted in FIGURE 6, then the observer swings or rotates the casing 22 about the vertical axis provided by the tubular portion 26. The previously alluded to flanges 54, 56, together with the opening 53 in the casing 22, permit this rotation to take place. When the observer has swung the casing 22 sufficiently to bring the zero graduation or other hair line that may be associated with the zero graduation into alignment with the second pole 12, then the user stops rotating the casing 22. Since an angle 16 of 90 degrees has been assumed in the present situation, then the image denoted by the reference numeral 70 is obtained, this image appearing in FIGURE 7.

While the foregoing is believed to be fairly straightforward, it can be said, as far as summarizing the use of the device 18 is concerned, the rotation of the upper reflector 60 about a vertical axis has caused the view beyond the mirror 60 to tilt and the degree markings or graduations 66 also to tilt or appear to rotate about the transparent member 64 which is in the form of a disc as already indicated. This is a natural phenomenon and is readily provable in practice and also with elementary optical diagrams. The one thing that the applicant wishes to emphasize, though, is that he has herein used the term "axis" even though the light rays do not strictly pass along a single line. Thus, the term "axis" is utilized for the purpose of indicating the direction in which portions of the device 18 extend and the term provides a convenient means of expression in the claim language hereafter presented.

One further point requiring possible clarification is the image provided by the bubble 52. It would only prove confusing to superimpose the image produced by the bubble 52 on FIGURE 6. Actually, the size of bubble 52 will normally be selected so that it coincides or substantially coincides with the size of the hole 40. Hence, the image produced by the bubble 52 can be considered to be in alignment with the hole 40, although slight deviations therefrom are actually desirable in order to demonstrate to the user or viewer that a vertical condition has been established with respect to the axis extending through the bore 28 of the tubular portion 26, such a condition showing that the passage 24 is being held in a horizontal position.

While the simplicity of the device 18 renders it quite attractive, particularly with respect to the compactness and lightweight characteristics of the device. However, in some applications the rotation of the image may prove to be objectionable. With this in mind, a second embodiment designated generally by the reference numeral 18a has been presented. For the purpose of facilitating a comparison between the two devices 18 and 18a the device 18a has been illustrated in FIGURE 8 as being oriented in the same direction as the device 18 appearing in FIGURE 2; similarly, the device 18a has the same orientation in FIGURE 9 as does the device 18 in FIGURE 3. In other words, the device 18a is utilized to determine the angle 16 residing between the poles 10 and 12 of FIGURE 1 when the device 18a is held at the vantage point 14. The outstanding advantage with respect to the device 18a stems however from the fact that the resulting image does not rotate when using the device.

With this aim in mind, it should be appreciated that those parts having close similarlity with the parts described in conjunction with the embodiment labeled 18 have been assigned the same reference numerals. Thus, certain parts need not be redescribed. It will be apparent from FIGURE 10, though, that due to the slight difference in construction of the lower casing 20, such casing has been distinguished by the suffix a. Consequently, the lower casing has been assigned 20a in FIGURE 10 and is distinguishable from its counterpart in FIGURE 4 by virtue of a somewhat larger flange 54a. The flange is made a trifle larger for a reason hereinafter explained.

To keep the comparison of the embodiment 18a with the embodiment 18 as simple and straight-forward as possible, the transparent member 64a has been retained in substantially the same location as it appears in FIGURE 4. The transparent member 64a is presented in greater detail in FIGURE 11. From FIGURE 11 it will be discerned that angular graduations 66a have been located at spaced intervals about one-half of the periphery of the member 64a. The reason for this will become clear later on.

The casing 22a is considerably longer than the casing 22. It is virtually twice as long and rotatably carries a third casing 72. The rotation is achieved through the agency of a sleeve or bushing 74 having upper and lower flanges 76, 78.

For the purpose of receiving light rays directed upwardly along a vertical axis through the bore of the sleeve 74 is a mirror 80 disposed at a 45-degree angle with the vertical axis and also with the horizontal axis that extends in the direction of the inclined mirror 60. The light rays are directed upwardly through the mirror 80 by a lower mirror 82 that is oriented on a 45-degree angle with respect to a horizontal axis extending forwardly through the front portion of the third casing 72. To assist in showing how the device 18a operates, it has been decided that a tube 84 will be helpful. This tube 84 has its axis oriented in a direction so as to allow light rays from the pole 10 to enter the third casing 22 along a horizontal axis, this being the condition appearing in FIGURE 8. However, FIGURE 9 shows the tube 84 turned through an angle so as to allow light rays from the pole 12 to enter the casing 72.

It has already been explained that the reason for the embodiment labeled 18a is to obviate the tilting of the image experienced with the embodiment 18. Whereas the offsetting of the mirrors 38 and 60 from each other produces a tilting of the image in one direction, the offsetting of the mirrors 80 and 82 in the embodiment 18a causes a tilting of the image in the opposite rotative direction. Thus, by rotating the casing 22a through a given angle, the image is caused to rotate through the same angle. However, by rotating the casing 72 about an equal angle such action can offset the image rotation that is produced by rotation of the casing 22a with respect to the casing 20a. To achieve this in an automatic fashion, the present invention envisages the use of a gear 86 that is held fast to the casing 28 through the medium of a screw 88 extending upwardly through the flange 54a. A second gear 90 is in mesh with the gear 86 and is attached to a third casing 72 through the medium of a screw 92. In actual practice, the gears 86, 90 would not mesh directly but would be part of a gear train comprising idler gears. The use of idler gears would permit the diameter of the gear 86 and the diameter of the gear 90 to be smaller. However, the use of the larger gears 86, 90 renders these gears visible in FIGURES 8 and 9 and thereby makes the role performed by the gearing more readily understandable.

In use, the observer would look through the eyepiece 36 of FIGURE 10 in the same fashion that he looks through the eyepiece 36 in FIGURE 4. Virtually the same image shown in FIGURE 6 would be seen with the exception of the more condensed spacing of the graduations 66a. Thus, it is not believed necessary to picture the image that is seen in the initial positioning of the device 18a.

By the same token, it is not believed necessary to show the final image derived from the device 18a after rotation of the casings 22a and 72 because it is very similar to the image initially realized. It will be recalled that the main objective of the embodiment 18a is to maintain the image vertical at all times. Thus, instead of the image of the pole 12 being rotated into a horizontal position, as shown in FIGURE 7, it remains vertical. However, the graduations 66a on the transparent member 64a do appear to rotate and the degree of rotation is one-half of that which appears in FIGURE 7. It will be understood, however, that the gears 86, 90 are instrumental in having the casing 72 turn through an angle with respect to the casing 22a that is exactly equal to the angle that the casing 22a is rotated with respect to the casing 20a. The angularity of the casings 20a, 22a and 72 is shown in FIGURE 9. When the casings are so oriented, the pole 12 is viewed along an axis extending through the tube 84 to the mirror 82 and thence upwardly along a vertical axis to the mirror 80 and then along the horizontal axis to the mirror 60. From the mirror 60 the light rays are directed downwardly along a vertical axis to the mirror 38 and then to the eyepiece 36. The observer, as in the case of the embodiment 18, still has a direct line of sight along a horizontal axis passing through the hole 40 in the mirror 38. Therefore, a composite image is shown that includes the central portion of the pole 10 and upper and lower portions of the pole 12 in direct vertical alignment therewith, the alignment being by reason of the shifting of the mirror 82 with respect to the mirror 80 as the mirror 60 is being shifted with respect to the mirror 38. The image provided by the transparent member 64a, however, does appear to tilt or rotate. The tilting that is derived is actually 45 degrees in the illustrated instance, so that the graduations 66a are located twice as close together as those graduations 66 on the transparent member 64. The end result is the same as far as determining the number of degrees in the angle 16, this being due to the fact that the lesser apparent rotation takes place when utilizing the embodiment 18a as compared to using the embodiment 18.

It will be recognized that any angle can be determined. The 90-degree angle labeled 16 has been quite arbitrarily selected, the basic reason for having selected such an angle residing principally because it results in a more pronounced shifting of the image. In other words, if a lesser angle were selected, then the angularity shown in FIGURE 7 would be naturally reduced to the same extent. It will also be appreciated that an angle greater than 90 degrees can be measured, it being possible to measure angles having a magnitude of 180 degrees. Actually, there is no limit to the angle that can be measured, for angles greater than 180 degrees can be determined when circumstances so dictate. All that the user need do is first establish a base line and then determine the terminus line and the transparency 64 or 64a, as the case may be, automatically signifies the angle being measured.

One further point to be borne in mind is that the device 18 or 18a need not be used in a horizontal plane. The bubble unit 42, quite obviously, facilitates the use of the instruments for measuring horizontal angles but the use is not in any way limited to horizontal angles. Actually, the bubble unit 42 could be relocated so as to inform the user when the device 18 or 18a is held properly for the measuring of vertical angles. Consequently, one of the advantages of the present invention over transits and other optical devices is that angles can be determined in any plane.

It will, of course, be understood that various changes may be made in the form, details, arrangements and proportions of the parts without departing from the scope of my invention as set forth in the appended claims.

What is claimed is:

1. An optical device for determining angles comprising:
   (a) a casing adapted to be held in the hand of an observer for permitting light rays from a remote object to travel along a first longitudinal sighting axis directly to the observer;
   (b) first reflector means fixedly disposed with respect to said first sighting axis and being provided with means to combine light rays along said first sighting axis and a second sighting axis which is perpendicular to and which intersects said first axis;
   (c) second reflector means spaced from said first sighting axis and rotatable about said second sighting axis to provide a third sighting axis in a plane parallel to said first sighting axis for reflecting along said second axis additional light rays arriving from said object when said first and third sighting axes are parallel and for reflecting along said second axis light rays arriving from a second remote object when said second reflector means is rotated;
   (d) a transparent member fixedly disposed with respect to said second reflector means and located on said third sighting axis and perpendicular thereto so that those light rays striking said second reflector means must pass therethrough,
   (e) said transparent member having angularly spaced graduations thereon located circumferentially about said third sighting axis providing an indication of the angular degree of inversion of the image along said third sighting axis and therefore the rotative position of said second reflector means.

2. An optical device in accordance with claim 1 including:
   (a) a member providing a reference line extending parallel to said second axis disposed in the path of said first-mentioned light rays for providing a reference line for the graduations on said transparent member, and
   (b) a transparent liquid and bubble containing unit disposed in said casing and oriented so that its bubble intersects said second axis when said first axis is horizontal.

3. An optical device for determining angles comprising:
   (a) a first casing adapted to be held in the hand of an observer for permitting the direct viewing of a remote object along a first sighting axis;
   (b) a second casing connected to said first casing for rotation in a plane parallel to said first sighting axis and about a second sighting axis extending perpendicularly to and intersecting said first axis;
   (c) a third casing rotatably connected to said second casing for rotation in a second plane parallel to said first plane and about a third sighting axis parallel to and spaced from said second axis;
   (d) said third casing having an aperture therein for the admittance of exterior light rays propagating along a fourth sighting axis in said second plane;
   (e) first reflector means including a mirror fixedly disposed at a 45° angle with respect to said first sighting axis within said first casing and being provided with means to combine light rays along said first axis and said second axis;
   (f) second reflector mirror means in said second casing for reflecting along said second axis light rays arriving along a fifth sighting axis perpendicular to and intersecting said second and third axes;
   (g) third reflector means in said second casing for reflecting along said fifth axis light rays passing along said third axis;
   (h) fourth reflector means in said third casing for reflecting along said third axis the light rays propagating along said fourth axis when said first and fourth axes are parallel and for reflecting along said third axis light rays propagating from a second remote object along a sixth axis in said second plane when said third casing is rotated;
   (i) means for rotating said third casing relative to said second casing through the same angle that said second casing is rotated relative to said first casing;
   (j) a transparent member mounted between said first and fourth mirrors in the path of light rays admitted through said aperture,
   (k) said transparent member being perpendicular to the path of light rays having angularly spaced graduations thereon providing an indication of the angle through which said third casing is rotated with respect to said first casing when said third casing is rotated from a first position in alignment with said first object to a second position aligned with said second remote object,
   (l) whereby the angle between said objects is thus determined.

4. An optical device in accordance with claim 3 in which said rotating means includes:
   (a) a first gear affixed to said first casing; and
   (b) a second gear in mesh with said first gear affixed to said third casing.

5. An optical device in accordance with claim 3 in which:
   (a) said transparent member is disposed in said second casing between said second and third mirrors;
   (b) means associated with said third casing for providing a reference line for the graduations on said transparent member, and
   (c) a transparent liquid and bubble containing unit disposed in said first casing oriented so that its bubble intersects said second axis when said first axis is horizontal.

References Cited

UNITED STATES PATENTS

| 954,707 | 4/1910 | Spear | 350—52 |
| 2,995,972 | 8/1961 | Baalson | 88—2.3 |

JEWELL H. PEDERSEN, *Primary Examiner.*

O. B. CHEW, *Assistant Examiner.*